(12) United States Patent
Novikov et al.

(10) Patent No.: US 11,258,815 B2
(45) Date of Patent: Feb. 22, 2022

(54) AI-BASED SYSTEM FOR ACCURATE DETECTION AND IDENTIFICATION OF L7 THREATS

(71) Applicant: Wallarm, Inc., San Francisco, CA (US)

(72) Inventors: Ivan Novikov, San Francisco, CA (US); Alexander Golovko, Novoivanovskoe (RU)

(73) Assignee: Wallarm, Inc., San Francisco, CA (US)

( * ) Notice: Subject to any disclaimer, the term of this patent is extended or adjusted under 35 U.S.C. 154(b) by 233 days.

(21) Appl. No.: 16/515,866

(22) Filed: Jul. 18, 2019

(65) Prior Publication Data

US 2020/0036739 A1 Jan. 30, 2020

Related U.S. Application Data

(60) Provisional application No. 62/702,814, filed on Jul. 24, 2018.

(51) Int. Cl.
*H04L 29/06* (2006.01)
*G06N 20/00* (2019.01)

(52) U.S. Cl.
CPC ......... *H04L 63/1425* (2013.01); *G06N 20/00* (2019.01); *H04L 63/102* (2013.01); *H04L 63/168* (2013.01)

(58) Field of Classification Search
CPC ....... G06F 21/50; G06F 21/552; H04L 63/14; H04L 63/16; H04L 63/20; H04L 63/1466; H04L 63/1425; H04L 63/168; H04L 63/1441; H04L 41/142; H04L 41/16; H04L 43/04; H04L 43/12; G06N 20/00
See application file for complete search history.

(56) References Cited

U.S. PATENT DOCUMENTS 10,721,239 B2 * 7/2020 Koottayi ............. G06K 9/6218
2016/0359695 A1 * 12/2016 Yadav .................. H04L 43/04

* cited by examiner

*Primary Examiner* — Olugbenga O Idowu
(74) *Attorney, Agent, or Firm* — Ascenda Law Group, PC

(57) ABSTRACT

Systems and methods for accurate detection and identification of application-level threats in a computer network include one or more nodes instantiated at protected systems and a network-based security platform communicatively coupled to receive data collected by the one or more nodes. Each node is configured to inspect application-level requests in inbound network traffic to a respective protected system. The security platform includes a three-layer machine learning engine to iteratively reconstruct each protected system's application business logic, identify associated application endpoints, data boundaries, and customary user behaviors based on the data collected by the one or mode nodes, and to create customized profiles for the protected systems and make those profiles available to the nodes instantiated at the protected systems. The security platform detects anomalies in the data provided by the nodes through comparisons with the behavior profile for each of the application endpoints.

15 Claims, 3 Drawing Sheets

AI-BASED SYSTEM FOR ACCURATE DETECTION AND IDENTIFICATION OF L7 THREATS

RELATED APPLICATIONS

This is a NONPROVISIONAL of, claims priority to, and incorporates by reference U.S. Provisional Application No. 62/702,814, filed 24 Jul. 2018.

FIELD OF THE INVENTION

The present invention relates generally to security functions for continuous integration/continuous deployment (CI/CD) environments, and, more particularly, to such solutions as provide protection against application-level attacks.

BACKGROUND

Within the field of security solutions for computer-based installations, and despite differences in architecture and data flow within such environments, traditional approaches to attack detection have relied on techniques such as signature-based heuristics with regular expression evaluation. For example, these methods were commonly employed in connection with computer systems even in the pre-Internet era and continue to be used today. Analyses are based on sequential checks of regular expressions, each of which represent a detection rule; i.e., a signature. Provided the rules are kept current, this approach is capable of identifying malicious traffic associated with known attacks. But, therein lies the shortcomings of this approach. Rule databases must be constantly and continually updated as attacks evolve, and users must stay current with these updates or else their systems become vulnerable to the new attacks. Moreover, the ever-growing database of rules against which traffic must be evaluated means that this approach has inherent latencies that will only grow worse with time. Finally, these approaches are ineffective against attacks that are not characterized by grammars covered by the regular expressions. For example, attacks based on recursively enumerable grammars are relatively immune to detection using such approaches.

More recently developed approaches to attack detection rely on individual or grammar-specific parsers to evaluate traffic. These so-called tokenizer approaches eschew universal, regular expression evaluation in favor of multiple grammar-specific parsers that produce far fewer false positive and false negative results. Tokenizer attack detection systems employ libraries of parser states (called contexts) that fall into two main groups: those covering injection attacks (in which an attacker provides untrusted input into a system, which input, when processed, alters execution of a program by the system) and those covering commanding attacks (in which untrusted inputs are accepted to build system commands in an insecure manner). While multiple contexts may be supported, this approach is still vulnerable to uncovered contexts and suffers from performance problems similar to the regular expression approach inasmuch as all of the traffic data must be normalized before it is evaluated.

SUMMARY OF THE INVENTION

Systems and methods for accurate detection and identification of application-level threats in a computer network include one or more nodes instantiated at protected systems and a network-based security platform communicatively coupled to receive data collected by the one or more nodes. Each node is configured to inspect (e.g., via deep packet inspection) application-level requests in inbound network traffic to a respective protected system. The network-based security platform includes a machine learning engine configured to reconstruct each protected system's application business logic, identify associated application endpoints, data boundaries, and customary user behaviors based on the data collected by the one or mode nodes, and to create customized profiles for the protected systems and make those profiles available to the nodes instantiated at the protected systems.

In various embodiments, the machine learning engine includes detection logic configured to apply feedback from monitored applications at respective ones of the protected systems to refine the security profiles for the protected system. The feedback may include: an application response behavior analysis, a scanning approach, use of logs, hooks, or traps, or a network administrator supervised approach. Each of the nodes may be configured to calculate local traffic metrics that characterize applications running on respective ones of the protective systems using statistical algorithms based on character distribution functions and send those metrics to the security platform. More generally, prior to providing the data, each node pre-calculates a profile of request features by calculating correlation metrics between request objects to understand which request parameters represent different application functions.

The machine learning engine at the security platform creates, in an iterative fashion, the customized security profiles composed of security rules for deployment to the one or more nodes. In particular, the machine learning engine is configured to determine functions of monitored applications at the protected systems through pattern recognition by identifying features in the data provided by the nodes, for example by syntactically analyzing the data provided by the nodes to identify each protected system's application endpoints. Further, the machine learning engine is configured to create a behavior profile for each of the application functions determined, which behavior profile consists of a data format model and a user behavior model. The security platform detects anomalies in the data provided by the nodes through comparisons with the behavior profile. The iterative creation of the behavior profiles relies on the data from the nodes as well as previously generated instances of data models, user behavior models, and application profiles.

These and further embodiments of the invention are discussed in greater detail below.

BRIEF DESCRIPTION OF THE DRAWINGS

The present invention is illustrated by way of example, and not limitation, in the figures of the accompanying drawings, in which.

DETAILED DESCRIPTION

The present invention provides a new approach to attack detection and applies machine learning techniques so as to refine detection grammars to be as close as possible to the grammar of the protected system. Through this machine learning approach, any grammar can be approximated, allowing coverage for any type of attack without the need to manually create signature lists or develop new custom parsers for newly discovered attacks. Moreover, this approach allows creation of not only blacklisted grammars, but also whitelisted grammars, ensuring that benign traffic is permitted access to the protected system.

In the present machine learning approach, detection logic uses feedback from an application to "tune" itself. This feedback can be any of several varieties, including an application response behavior analysis, a scanning approach, use of logs, hooks, or traps, or a manual approach under the supervision of a network administrator, etc. By customizing the detection logic to the protected system, accuracy (in terms of reducing the rate of false positives and false negatives) is improved over prior systems. Moreover, true negatives are able to be confirmed.

Figure 1:
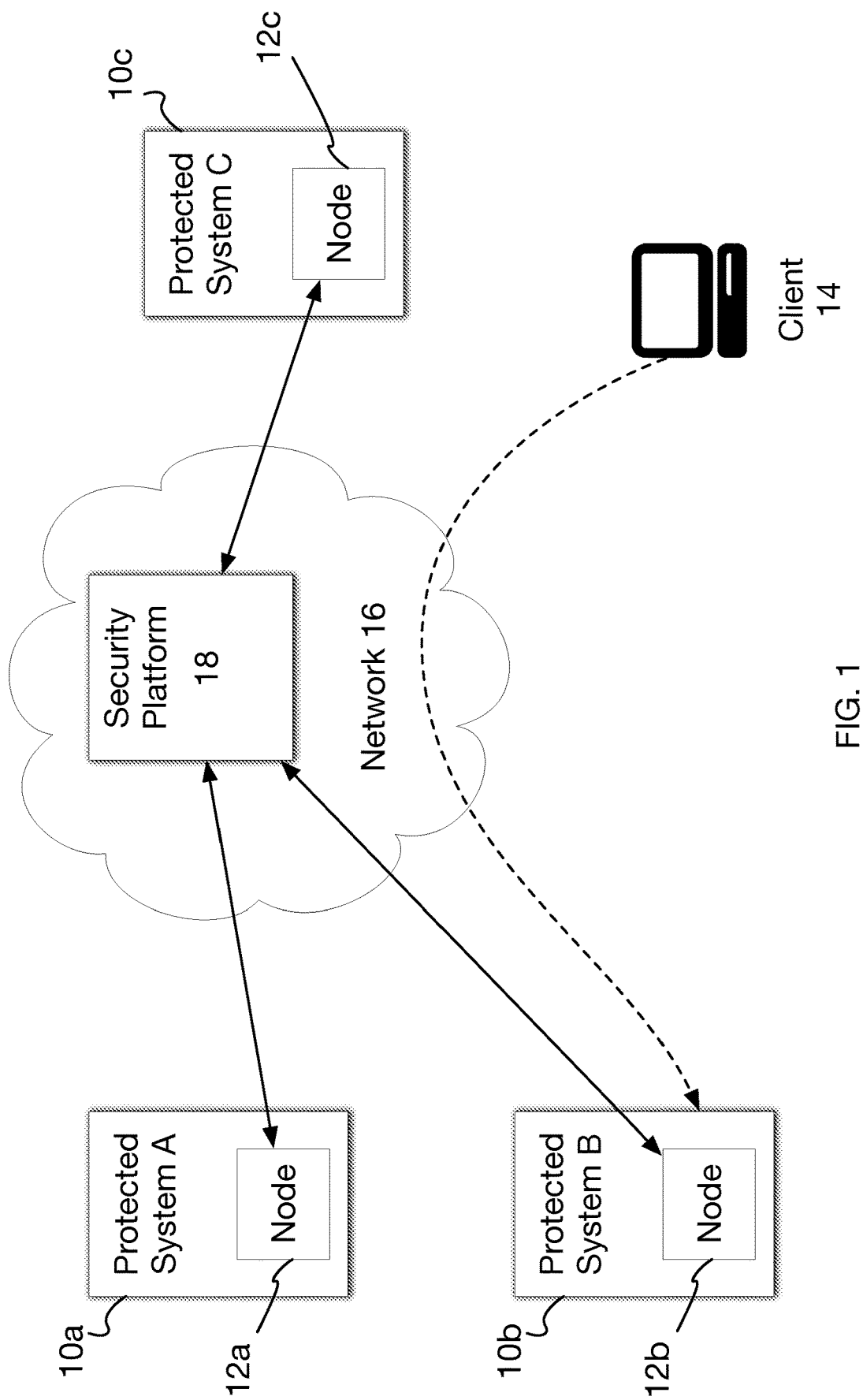
FIG. 1 illustrates an example of a network in which nodes configured to inspect inbound traffic are instantiated at protected systems and are communicably coupled with a network-based security platform which employs a machine learning engine to reconstruct each protected system's application business logic, identify associated endpoints, data boundaries, and customary user behaviors based on the data collected from the nodes, in accordance with embodiments of the present invention.

Referring now to FIG. 1, an example of an architecture within which embodiments of the present invention may be implemented is shown. In this system, various protected systems, 10a, 10b, 10c, are instrumented with respective nodes 12a, 12b, 12c. Each respective node is deployed at a protected system and inspects traffic inbound to that system. For example, node 12b inspects traffic inbound to protected system 10b from a client 14 over network 16 (e.g., the Internet). The nodes communicate with a security platform 18, which may be deployed within network 16 or may be deployed in another network.

The nodes 12a, 12b, 12c, employ deep packet inspection to decode and analyze traffic, including nested protocol traffic. Traffic metrics that characterize the applications running on the respective protective systems 10a, 10b, 10c, are calculated locally by each respective node using statistical algorithms based on character distribution functions, rather than regular expressions. These metrics are sent to the security platform 18.

Security platform 18 runs a three-layered machine learning engine to reconstruct each protected system's application business logic, identify associated endpoints, data boundaries, and customary user behaviors based on the data collected from the nodes 12a, 12b, 12c. Customized security rules are then deployed to the respective nodes. Because the nodes continuously generate application metrics and send same to the security platform, the security platform is continuously adjusting and refining the respective application profiles and corresponding security rules and deploying same back to the nodes.

The customized approach to security rule development afforded by the present invention enhances run-time application security for modern applications and application programming interfaces (APIs). The present approach recognizes that different applications (e.g., Web-accessible services) are different both in structure and in content. Things that are harmful to one application may be normal for another. Moreover, user behavior may vary between applications and individual application functions. For example, several log-in calls every second may indicate a credential stuffing attack, while several data layer queries per second may be a normal function of building a correlated data set. By employing machine learning technology, the present security platform is able to identify application functions, profile normal behaviors, and thereby create rules that will detect attacks.

In the first phase of the learning process, application functions (endpoints) are determined through pattern recognition. This is done by identifying features in the application traffic. In machine learning, a feature is an individual measurable property, characteristic of the pattern being observed. Choosing features that are both independent and discriminating is important to the effectiveness of the machine learning model. String and graph features are common for syntactic pattern analysis.

Embodiments of the present invention employ models in which each feature represents a separate hypertext transfer protocol (HTTP) request field with a value. The feature may be a part of a uniform resource locator (URL) path, a JavaScript object notation (JSON) parameter inside a request body, an HTTP header, or anything else. By applying this model, the security platform is able to derive a full application business logic profile. For example, the business logic may include specifying that the log-in function must be called by HTTP requests to a specified host (e.g., auth.domain.com), with a specified URI (e.g., /api/call), and a particular request body that includes a specified JSON method (e.g., a JSON "method" parameter with a value of "authenticate").

For each of the different application functions so recognized, a behavior profile is created. This profile consists of two different machine learning models: a data format model and a user behavior model. The data format model is a statistical model for character combination (or n-grams) distribution functions for each of the data parameters related to the application call variant (endpoint). For example, it may specify that a username should be patterned like an email address and a password should have eight or more characters with at least one special character. The user behavior model is a machine-readable representation of normal user activity, including how often calls are made to each particular endpoint, an expected order for calling the endpoints (like wizard steps), any necessary prerequisites for each call, and so on.

Finally, the attack detection phase comes into play if a request that falls outside the normal behavior model identified in the previous stage is detected. A suspect request may contain either a data or a behavior anomaly. Data format statistical model anomalies can be present in one or many data fields. A user behavior anomaly may include an attempt to bypass steps of a wizard, guessing passwords too frequently, site crawling, etc. For all these cases, once the anomaly is detected the present system may classify the attack type. Data anomalies are often related to structured query language (SQL) injections, cross-site scripting (XSS), server-side request forgery (SSRF), extended markup language external entity (XXE) processing, and other input validation attacks. User behavior anomalies are often related to password brute force attacks, credential stuffing attacks, authentication issues, etc.

Figure 2:
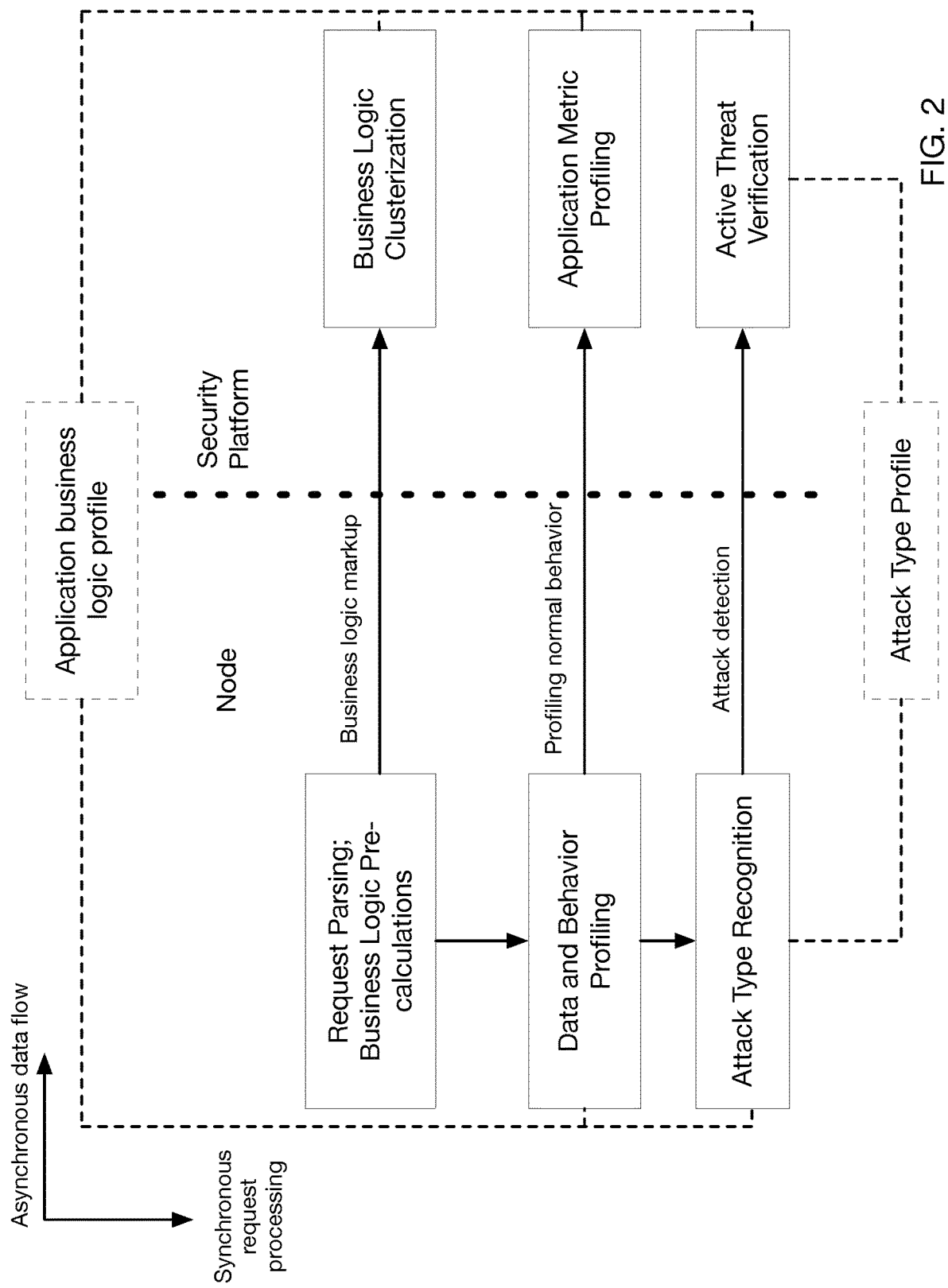
FIG. 2 illustrates an example of an architecture for a security platform such as that illustrated in FIG. 1, in which the dashed lines indicate profiles created by the security platform and made available to nodes instantiated at protected systems, in accordance with embodiments of the present invention.

The above-described architecture is illustrated in FIG. 2, in which the dashed lines indicate the profiles created by the security platform and made available to the nodes. Importantly, the business logic evaluations carried out by the security platform may be clustered across all protected systems for which the security platform is responsible. So too may the application metric profiling be done across all of the data reported by nodes associated with different protected systems. This allows for creation of application profiles that take into account many different systems.

Figure 3:
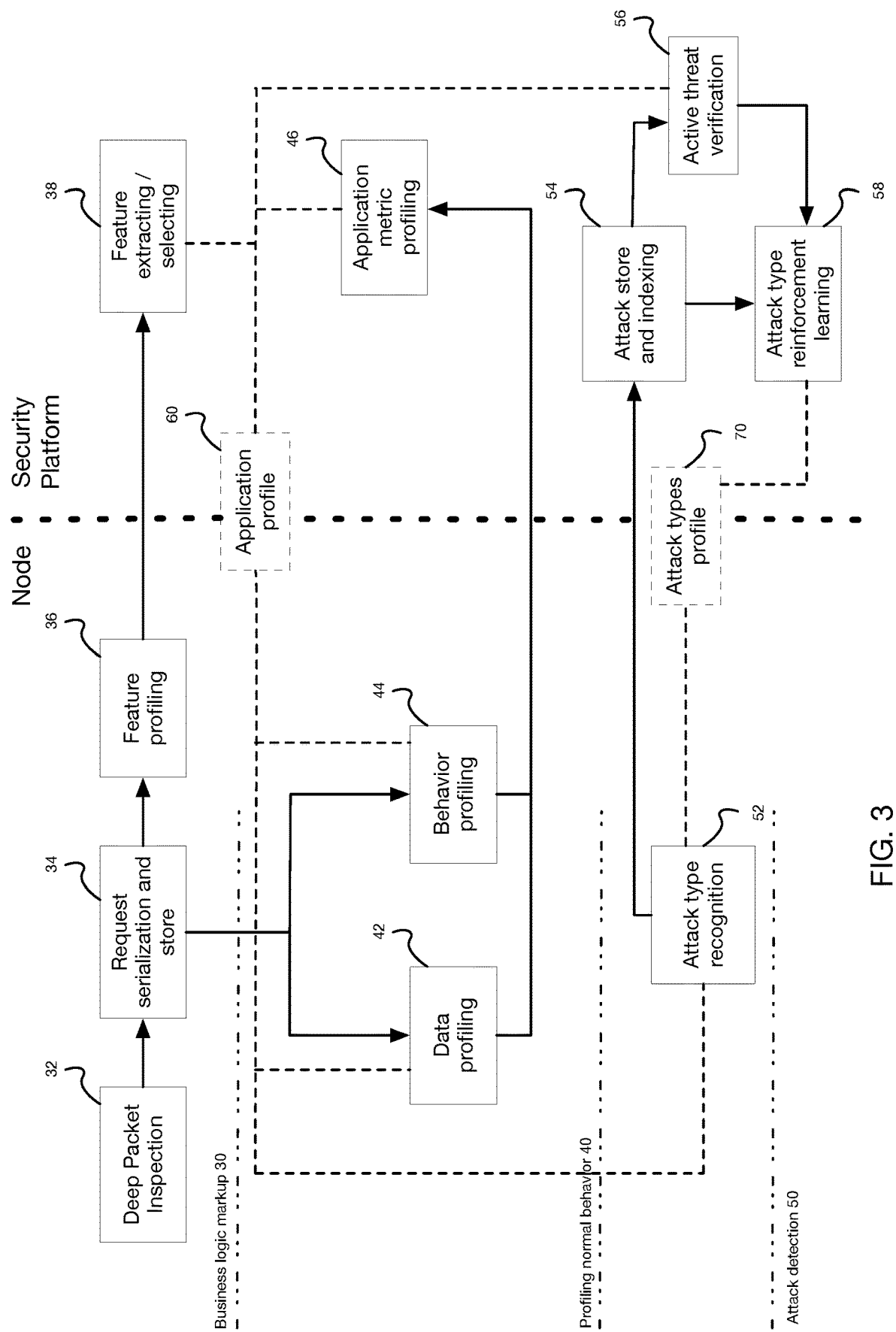
FIG. 3 illustrates an example of an architecture of a machine learning engine included in a security platform such as that shown in FIGS. 1 and 2, in accordance with embodiments of the present invention.

The machine learning engine included in the security platform 18 is composed of three stages, each using different machine learning models. It relies on a unique combination of the statistical and deep learning principles including hierarchical clusterization, statistical n-gram based models, recurrent neural networks and reinforcement learning. The architecture of the machine learning engine is depicted in FIG. 3.

In the business logic markup stage 30, HTTP requests are parsed and the node determines what application business logic is represented by each of the requests. This process is sometimes called Deep Packet Inspection (DPI) 32 in firewall and intrusion prevention system (IPS) solutions, but in embodiments of the present invention it is L7 (application layer) request inspection, not L3 (network layer) packets. Each HTTP request is parsed, serialized and stored 34, and then preprocessed 36 in an in-memory database which is a part of the node. With its strong DPI facilities, the node is capable of identifying and decoding all or virtually all modern web application data formats including but not limited to XML, JSON, Web Sockets, Base64, GZIP, VIEWSTATE, PHP, and Java serialization formats. Moreover, the present system can parse even complicated nested data encodings like Base64 inside a JSON field inside XML, and do so at high speed. The speed of processing is enabled by the algorithms based on statistical data profiling, which is what allows the present system to make decisions about the applicable data format for each HTTP request field without parsing it. As a result, parsers only run when they are needed. It is important to note here that a request can be parsed into one or more serialized objects, which happens because some encodings are mutually exclusive. For example, a request with a "Content-Type: application/form-urlencoded" may have a JSON body, meaning that it can be decoded as form data and as JSON as well. These two variants of initial raw request decoding generate two different decoded request objects. This is important because otherwise it may be possible to bypass this detection logic.

As an aside, it is worth noting that many conventional network security solutions support data formats wrapped inside HTTP and other protocols. However, it remains to be determined, based on traffic analysis, which data formats should be applied to which field. This is an analytically unsolvable problem because it requires understanding the application business logic. Rather than undertake such an analysis, many existing solutions simply resort to inspecting headers, using a first discovered suitable data format, or even require manual solutions. Header inspection is often inadequate because not all data fields have the needed information. Moreover, an attacker can easily set different header values than those expected by an application. Practically then, most existing solutions select formats automatically and the first suitable parser is applied, opening up opportunities to bypass the attack detection system using a payload constructed in a well-formatted manner. Such bypasses are not available with systems configured in accordance with the present invention.

After the initial parsing and data decoding, all the requests are serialized to the key-value objects (including WL, JSON and other data inside) 34. In other words, the raw requests are transformed into decoded and serialized request objects. These request objects are stored in the in-memory database co-located with the node for further processing. It is important to note here that the store procedure is non-blocking. The request will be handled by real-time protection logic (passed to the backend or blocked in case of attack), regardless of whether it is being committed to a local in-memory database in parallel. If the database is not available, the request processing mechanism is not adversely affected.

Once the traffic is parsed, the security platform applies machine learning to syntactically analyze the application and identify the application endpoints. First a request features profiling pre-calculation phase 36 takes place at the node. This calculation happens asynchronously inside the in-memory database and follows the same algorithms as clusterization. During this phase the node calculates correlation metrics between request objects to understand which HTTP parameters represent different application functions.

The entire task of application business logic markup is split between the node and the security platform, with the final decision being made on the platform side. All nodes pre-calculate local clusters and send the results to the security platform for feature second-order clusterization 38. As a result, marked up business logic calls, called "actions," are produced.

Table 1 provides an example of how one API call may be represented in the present system.

TABLE 1

| Request body | Business logic representation |
| --- | --- |
| POST /api HTTP/1.1<br>HOST: api.local<br>Content-Type: application/json<br>...<br><br>{"method":"login",<br>    "username":"admin@local",<br>    "password":"s3cr3t!"} | Action: {<br>    ID => 31337,<br>    Conditions => [<br>        METHOD eq "POST"<br>        URI_PATH -> 0 eq "api"<br>        HEADER -> HOST eq "api.local"<br>        POST -> BODY -> JSON -> method eq "login"<br>    ]<br>} |

The second stage of machine learning, profiling normal behavior 40, takes the data profile 42 and behavior profile 44 results of the first stage and the current application profile 60 as inputs. Storing request objects at the previous phase is important because all the behavior statistical metrics are calculated there. These statistical metrics and their correlations between request objects enable detection of brute force, credential stuffing, authentication and other behavior-based attacks when it is difficult or impossible to make a decision about blocking by analyzing only one request without user session tracking. The node also has the ability to work without the in-memory database, however, in such instances the solution would no longer be able to detect behavior-based attacks.

The security platform uses another machine learning model based on characters and its combinations distribution functions. These character combinations, also known as n-grams or shingles, are also initially generated by machine learning algorithms 46 on the platform-side to cover all known attack payloads and data structures. Many (e.g., hundreds of) different character distribution functions may be used to calculate a dynamic data template for each of the request fields.

The statistical-based approach allows systems configured in accordance with the present invention to analyze each data field with one single-run operation, in contrast to the regular expressions-based approach which requires re-read operations in many cases. The resulting n-gram distribution values are stored in the request object in the in-memory database and serve as inputs to the next iteration of profile generation. The result of this can be visualized as shown in Table 2.

not to try to parse this data because it is a binary stream), data format (e.g., Base64, GZIP, XML, or JSON parser required), and upload file format (e.g., documents, images, video, or other file types).

The user behavior profile is also defined by a number of "Hints" objects of different types. This approach covers behavior patterns, such as how frequently a user normally uses this application action, the sequence and order in which the actions should be called, and many other important metrics. We believe that this approach can cover any business logic of any application. It can also be easily extended by adding new types of "Hints". User behavior hints allow the present system to protect against bots, application denial of service attacks, and other behavior-based attacks like password brute force, credential stuffing, and so on.

During the final stage of the request analysis, attack detection 50, the present system applies a machine learning-based algorithm 52, 54, 56 to classify previously detected anomalies by attack types and eliminate false positives. Anomalies are identified by applying fuzzy search to a statistical character distribution model 70. Attack types are recognized by analyzing the current request against the machine learning model of the application graph. This allows the present system to identify a broad set of possible issues automatically without having to generate signatures manually. This approach is also more resistant to most of the WAF-bypass-techniques.

It is important that the attack type recognition applies only to the abnormal requests detected at the previous stages.

TABLE 2

| Request body | Business logic representation |
|---|---|
| POST /api HTTP/1.1<br>HOST: api.local<br>Content-Type: application/json<br>. . .<br>{"method":"login",<br>  "username":"admin@local",<br>  "password":"s3cr3t!"} | Hint: {<br>  ID => 525,<br>  Action => 31337<br>  Type => data_profile,<br>  Profile => [<br>    POST -> BODY -> JSON -> username<br>  = [11726.394, 737.77364, . . .]<br>  ]<br>}<br>Hint: {<br>  ID => 526,<br>  Action => 31337<br>  Type => data_profile,<br>  Profile => [<br>    POST -> BODY -> JSON -> password<br>  = [726.394, 57.7564, . . .]<br>  ]<br>} |

As evident from this example, each data profile is described with a "Hint" notation and a type of "data_profile". This proprietary notation describes different properties of the behavior and business logic such as the data profile for each particular request field. "Hints" are generated based on the analysis of requests over time and describe different properties of the application, allowing for better anomaly detection. Examples of hints include binary data (the hint is This means, for example, that SQL-related commands in legitimate control panels will not be detected. We called these cases "legal true negatives" to identify that it is normal, according to application behavior, to have attack-like payloads in some HTTP request fields. For example, it is normal to post some SQL-injection payloads in a security-related blogpost. The attack classification process can be visualized as shown in Table 3.

TABLE 3

| Request body | Business logic representation |
| --- | --- |
| POST /api HTTP/1.1<br>HOST: api.local<br>Content-Type: application/json<br>...<br>{"method":"login",<br>"username":"t@local' or 7=7--a-",<br>"password":"secret"} | [x] Abnormal data check triggered for the application action #31337<br><br>[x] SQL injection grammar profile stamp 2549 (logic-based injection variant) detected with a probability of 84.72% |

Another differentiated part of the present machine learning approach is reinforcement learning 58. Reinforcement learning is a discipline of artificial intelligence which focuses on making sequences of decisions. Within the reinforcement learning model, an agent observes the environment and takes actions to optimize rewards. After every action, the agent makes another observation to understand if the overall reward metric is improving. The key part of reinforcement learning is that it deals with previously unknown environments through a learning process that usually involves much trial and error. In the case of the present system, the application itself and its request and response traffic represent the environment. The filtering node at the protected system is the agent.

By way of example, assume that a protected system is a resource such as stackoverflow.com or a personal blog of a security expert. This means that some request fields, like a message/blogpost text, may include a payloads/exploit as a matter of course as this type of information is frequently shared at such sites. Based on this normal application behavior, these payloads-related data would normally pass through the detection engine. But how does the artificial intelligence engine know whether these payloads are dangerous for the application? This is a difficult problem because there could be many requests with payloads from many different sources that look like normal traffic yet in fact could be malicious.

To be able to allow certain payloads to pass as safe, the detection logic should determine beforehand that this data cannot exploit any vulnerability in the protected system. This type of data may look like a payload or even be an actual payload (in a case of control panel and other legal true negatives). This task is actually equivalent to a vulnerability detection problem, because if one knows that a payload affects the protected system at a particular endpoint, then it is known there is a vulnerability there. Worth noting: the attack detection logic must have vulnerability detection capabilities to train itself. This is an example of a reinforcement learning observation which affects action.

Vulnerability detection is typically a job for scanners. However, many scanners do not work well with modern applications and APIs because of the sophisticated L7 data protocols and encoding formats involved. Active scanners can only uncover detailed information about requests during the crawling phase, when they attempt to mirror a web site by recursively downloading pages and emulating browser behavior. These conventional scanning methods are ineffective for single page applications and APIs, which are impossible to crawl.

Conversely, the present system generates a full map of all the available API calls and data structures. This map is created during the profiling stage described above. Thus, the present system makes active scanning possible. Additionally, the present system implements a passive vulnerability detection approach. Some of the vulnerabilities can be detected by the sequence of requests and responses as well as correlation analysis of the requests' and responses' content. This allows the present system to detect vulnerabilities even before they are tested for by the active scanner.

Even though passive scanning is important, some of the vulnerabilities that can be exploited out-of-bounds (OOB) are not detectable by passive correlation and require the active scanner. Among these are such important vulnerabilities as Remote Code Execution (RCE), Remote File Inclusion (RFI), Server-Side Request Forgery (SSRF) and XML eXternal Entity (XXE). Overall, it is a unique feature of the present system to reinforce machine learning by passive and active vulnerability scanning results to deliver a very low level of false positives in attack detection and to distinguish exploitable attacks from aggressive noise. The detection logic now uses feedback from the application to be able to tune itself.

Thus, security functions for CI/CD environments that provide protection against application-level attacks have been described.

What is claimed is:

1. A system for accurate detection and identification of application-level threats in a computer network, said system comprising:
one or more nodes, each respective node configured to inspect application-level requests in inbound network traffic to a respective protected system at which said respective node is instantiated; and
a network-based security platform communicatively coupled to receive data collected by the one or more nodes, said network-based security platform including a machine learning engine configured to reconstruct each protected system's application business logic, identify application endpoints of each of the protected systems, data boundaries, and customary user behaviors based on said data collected by the one or more nodes, and to create customized profiles for said protected systems and make said customized profiles available to said one or more nodes instantiated at the protected systems,
wherein prior to providing the collected data to the network-based security platform, each of the one or more nodes pre-calculates a profile of request features by calculating correlation metrics between request objects to determine which one of the application endpoints is associated with each parameter of the application-level requests.

2. The system of claim 1, wherein the machine learning engine includes detection logic configured to apply feedback from respective monitored applications at respective ones of the protected systems to refine a respective one of the customized profiles for one of the protected systems.

3. The system of claim 2, wherein the feedback comprises one or more of: an application response behavior analysis, a scanning approach, use of logs, hooks, or traps, or a network administrator supervised approach.

4. The system of claim 1, wherein the one or more nodes employ deep packet inspection to decode and analyze the inbound network traffic.

5. The system of claim 4, wherein each respective one of the one or more nodes is configured to calculate local traffic metrics that characterize applications running on a respective one of the protective systems using statistical algorithms based on character distribution functions and send said metrics to the network-based security platform.

6. The system of claim 1, wherein the machine learning engine comprises a three-layered machine learning engine to create the customized profiles, wherein the customized profiles are composed of security rules for deployment to the one or more nodes.

7. The system of claim 6, wherein the machine learning engine is configured to determine the application endpoints of each of the protected systems through pattern recognition by identifying features in the data collected by the one or more nodes.

8. The system of claim 7, wherein the machine learning engine is configured to create a behavior profile for each of the application endpoints determined, said behavior profile consisting of a data format model and a user behavior model.

9. The system of claim 8, wherein the network-based security platform is configured to detect anomalies in the data collected by the one or more nodes through comparisons with the behavior profile.

10. The system of claim 6, wherein the machine learning engine is configured to syntactically analyze the data collected by the nodes to identify the application endpoints of each of the protected systems.

11. The system of claim 6, wherein the machine learning engine is configured to iteratively create behavior profiles for applications running on the protected systems based on the data collected by the one or more nodes and using previously generated instances of data models, user behavior models, and application profiles.

12. A method for accurate detection and identification of application-level threats in a computer network, the method comprising:

at one or more nodes, each respective node associated with a respective protected system, inspecting application-level requests in inbound network traffic to the respective protected system at which said respective node is instantiated using deep packet inspection and communicating data collected by said respective node to a network-based security platform;

at the network-based security platform using a machine learning engine, reconstructing each protected system's application business logic, and identifying application endpoints of each of the protected systems, data boundaries, and customary user behaviors of applications running on said protected systems based on said data collected by the one or more nodes to create customized profiles for said protected systems; and making said customized profiles available to said one or more nodes instantiated at the protected systems, and at the network-based security platform applying feedback from respective monitored applications at respective ones of the protected systems to refine the customized profiles for the protected systems, wherein prior to providing the collected data to the network-based security platform, each of the one or more nodes pre-calculates a profile of request features by calculating correlation metrics between request objects to determine which one of the application endpoints is associated with each parameter of the application-level requests.

13. The method of claim 12, wherein each respective one of the one or more nodes calculates local traffic metrics that characterize applications running on a respective one of the protective systems using statistical algorithms based on character distribution functions and sends said local traffic metrics to the network-based security platform.

14. The method of claim 12, wherein the machine learning engine includes a three-layered machine learning engine to create the customized profiles composed of security rules for deployment to the one or more nodes by (a) determining the application endpoints of each of the protected systems through pattern recognition by identifying features in the data collected by the one or more nodes, and (b) creating a behavior profile for each of the application endpoints so determined, said behavior profile consisting of a data format model and a user behavior model.

15. The method of claim 14, wherein the network-based security platform detects anomalies in the data collected by the one or more nodes through comparisons with the behavior profile for each of the application endpoints.

* * * * *